United States Patent [19]
Reasoner

[11] Patent Number: 5,881,249
[45] Date of Patent: Mar. 9, 1999

[54] I/O BUS

[75] Inventor: Kelly J. Reasoner, Fort Collins, Colo.

[73] Assignee: Hewlett-Packard Company, Palo Alto, Calif.

[21] Appl. No.: 509,626

[22] Filed: Jul. 31, 1995

[51] Int. Cl.⁶ .................................................. G06F 13/36
[52] U.S. Cl. ............................................................ 395/281
[58] Field of Search ........................ 395/281; 340/825.52, 340/825.53; 333/33; 174/28

[56] References Cited

U.S. PATENT DOCUMENTS

| | | | |
|---|---|---|---|
| 4,183,084 | 1/1980 | Lawson | 364/200 |
| 4,504,936 | 3/1985 | Faber et al. | 369/34 |
| 4,604,689 | 8/1986 | Burger | 364/200 |
| 4,667,323 | 5/1987 | Engdahl et al. | 340/825.52 |
| 5,010,536 | 4/1991 | Wanger et al. | |
| 5,148,432 | 9/1992 | Gordon et al. | 371/10.1 |
| 5,239,632 | 8/1993 | Larner | 395/325 |
| 5,263,139 | 11/1993 | Testa et al. | 395/281 |
| 5,274,783 | 12/1993 | House et al. | 395/281 |
| 5,295,258 | 3/1994 | Jewett et al. | 395/575 |
| 5,333,277 | 7/1994 | Searls | 395/281 |
| 5,371,743 | 12/1994 | DeYesso et al. | |
| 5,377,328 | 12/1994 | Benham | 395/250 |
| 5,379,184 | 1/1995 | Barraza et al. | 361/685 |
| 5,390,187 | 2/1995 | Stallmo . | |
| 5,412,668 | 5/1995 | Dewey | 371/40.1 |
| 5,467,456 | 11/1995 | Moxley et al. | 364/490 |
| 5,536,176 | 7/1996 | Borchew et al. | 439/61 |
| 5,544,339 | 8/1996 | Baba | 395/441 |
| 5,566,345 | 10/1996 | Ostrowski | 395/822 |
| 5,600,783 | 2/1997 | Kakuta et al. | 395/182.04 |
| 5,611,056 | 3/1997 | Hotchkin | 395/281 |
| 5,740,198 | 4/1998 | Ham | 375/257 |

FOREIGN PATENT DOCUMENTS

| | | |
|---|---|---|
| 0320107A2 | 6/1989 | European Pat. Off. . |
| 053592 A2 | 4/1993 | European Pat. Off. . |

OTHER PUBLICATIONS

ANSI X3.131–1986 SCSI Standard Jun. 23, 1986.
U.S. application Ser. No. 08/296,069, Paul et al., filed Aug. 24, 1994.
U.S. application Ser. No. 08/331,468, Johansson, filed Oct. 31, 1994.

*Primary Examiner*—Ayaz R. Sheikh
*Assistant Examiner*—Paul R. Myers

[57] ABSTRACT

A new I/O bus which may be used in constructing a multiple drive library computer system which is repairable while the system remains online. The I/O bus generally operates under a SCSI-type protocol. The bus comprises a primary I/O bus, and a plurality of secondary I/O buses, pigtailed to said primary bus. The pigtailed I/O buses are longer than the 100 mm stubs which are sanctioned under a SCSI protocol.

9 Claims, 12 Drawing Sheets

DRIVE STATE DEFINITIONS:

| DRIVE STATE | DEFINITIONS |
|---|---|
| ONLINE_GOOD | THE DRIVE IS ONLINE AND IN A GOOD STATE. THIS IS THE NORMAL STATE. ALL ACCESSES TO THE DRIVE ARE ALLOWED. |
| ONLINE_PENDING | THE DRIVE IS OFFLINE, AND IS READY TO GO TO THE "ONLINE_GOOD" STATE. NO ACCESSES TO THE DRIVE ARE ALLOWED. |
| OFFLINE_FAILED | THE DRIVE IS OFFLINE, AND IS IN A FAILED STATE. NO ACCESSES TO THE DRIVE ARE ALLOWED. NO POWER IS APPLIED TO THE DRIVE. |
| OFFLINE_GOOD_PENDING | THIS DRIVE IS ONLINE, BUT IS REQUESTING TO GO TO THE "OFFLINE_GOOD" STATE. ALL ACCESSES TO THE DRIVE ARE ALLOWED. |
| OFFLINE_GOOD | THE DRIVE IS OFFLINE, BUT IS NOT IN A FAILED STATE. NO ACCESSES TO THE DRIVE ARE ALLOWED. NO POWER IS APPLIED TO THE DRIVE. |

*FIG.10*

SCSI "WRITE BUFFER" COMMAND

WRITE BUFFER CDB FORMAT:

THE "MODE" FIELD MUST BE SET TO 1 (VENDOR SPECIFIC)
THE "BUFFER ID" FIELD MUST BE SET TO 128 (0x80)
THE "PARAMETER LIST LENGTH" FIELD MUST BE SET TO 16

WRITE BUFFER DATA FORMAT:

| BYTE | DESCRIPTION |
|---|---|
| 0 | DRIVE 1 CONTROL |
| 1 | DRIVE 2 CONTROL |
| 2 | DRIVE 3 CONTROL |
| 3 | DRIVE 4 CONTROL |
| 4 | DRIVE 5 CONTROL |
| 5 | DRIVE 6 CONTROL |
| 6 | DRIVE 7 CONTROL |
| 7 | DRIVE 8 CONTROL |
| 8 | DRIVE 9 CONTROL |
| 9 | DRIVE 10 CONTROL |
| 10 | DRIVE 11 CONTROL |
| 11 | DRIVE 12 CONTROL |
| 12 | RESERVED |
| 13 | RESERVED |
| 14 | RESERVED |
| 15 | RESERVED |

DRIVE CONTROL DEFINITION:

| 0x00 | NO CHANGE TO THE DRIVE STATE |
|---|---|
| 0x01 | SET DRIVE TO "ONLINE_GOOD" STATE |
| 0x04 | SET DRIVE TO "OFFLINE_FAILED" STATE |
| 0x06 | SET DRIVE TO "OFFLINE_GOOD" STATE |

FIG.11

SCSI "READ BUFFER" COMMAND

READ BUFFER CDB FORMAT:

THE "MODE" FIELD MUST BE SET TO 1 (VENDOR SPECIFIC)
THE "BUFFER ID" FIELD MUST BE SET TO 128 (0x80)
THE "PARAMETER LIST LENGTH" FIELD MUST BE SET TO 16

READ BUFFER DATA FORMAT:

| BYTE | DESCRIPTION |
|---|---|
| 0 | DRIVE 1 STATUS |
| 1 | DRIVE 2 STATUS |
| 2 | DRIVE 3 STATUS |
| 3 | DRIVE 4 STATUS |
| 4 | DRIVE 5 STATUS |
| 5 | DRIVE 6 STATUS |
| 6 | DRIVE 7 STATUS |
| 7 | DRIVE 8 STATUS |
| 8 | DRIVE 9 STATUS |
| 9 | DRIVE 10 STATUS |
| 10 | DRIVE 11 STATUS |
| 11 | DRIVE 12 STATUS |
| 12 | RESERVED |
| 13 | RESERVED |
| 14 | RESERVED |
| 15 | RESERVED |

DRIVE STATUS DEFINITIONS:

| | |
|---|---|
| 0x00 | DRIVE IS NOT VALID |
| 0x01 | ONLINE_GOOD |
| 0x02 | ONLINE_PENDING |
| 0x04 | OFFLINE_FAILED |
| 0x05 | OFFLINE_GOOD_PENDING |
| 0x06 | OFFLINE_GOOD |

FIG.12

I/O BUS

BACKGROUND OF THE INVENTION

This invention pertains to a new I/O bus which may be used in constructing a multiple drive library computer system. With the newly invented I/O bus disclosed herein, repair of a failed drive may occur while one or more good drives in the library system remain online. In this manner, a host may have continual and uninterrupted access to information stored within the library.

Although the I/O bus disclosed herein is especially advantageous in removable media type multiple drive library computer systems, it may also be adapted to other multiple component computer systems as well.

The I/O bus disclosed herein may be used in conjunction with the Computer Frame Structure with Modular Housings and system and method of Online Drive Repair disclosed herein.

In a multiple drive library computer system, the first component to fail due to excessive use is often a storage drive. Typically, when a storage drive fails, the library undergoes a period of down time while the drive is repaired and/or replaced. During this down time, a host (whether it be a UNIX® work station, PC network server or otherwise) cannot access any of the information contained within the library.

Since loss of information access is unacceptable, efforts have been made to minimize library down time. These efforts include Redundant Array of Inexpensive Disks (RAID) and hot repair technologies.

The RAID technology involves a method of reconstructing data which is lost in the event of a drive's failure. Data is stored in a redundant array of nonremovable media type drives, such that when a failed drive is replaced, an error-correction operation can be applied to the data blocks of the remaining storage drives in the redundant array so that the data which was lost can be reconstructed. Although the RAID method helps to minimize library down time, the method is not applicable to removable media type libraries. In a removable media type library, failure of a drive does not result in loss of data. It only results in loss of access to data.

In a hot repairable system, storage drives are guided on rails into hot repair sockets. A failed drive may be removed from its socket without notification to the library system or a host. As the failed drive is pulled from its socket, a system of long and short pins is used to incrementally disconnect power to the drive, to notify the library system and the host that the drive is no longer available, and to make the necessary changes in system parameters to keep the library system online. However, there is a barrier to implementing hot repair technology in a removable media type library. The barrier exists due to the requirement of a removable media type library that the media inserting faces of its storage drives face a robotic media inserter. In order to keep such a system online, it is necessary to remove storage drives by pulling them away from the robotic inserter. To do this, the electrical connection faces of the storage drives (which in standard drives are opposite their media inserting faces) must be free of blockage (sockets, circuit boards, pins, etc.). To affect a hot repair of a removable media storage drive, a storage drive would need to be constructed wherein its media inserting face and electrical connection face were on adjacent sides, rather than on opposite sides. This is an added expense which is unnecessary in view of the online repairable system and method of online drive repair disclosed herein.

It is therefore a primary object of this invention to significantly reduce the down time of a multiple drive library computer system upon failure of one or more of the library's storage drives. In the case of a removable media type library, it is believed that library down time can be eliminated.

It is a further object of this invention to allow a host to have continual access to one or more good storage drives of a multiple drive library computer system while one or more failed drives of the library are repaired.

SUMMARY OF THE INVENTION

In the achievement of the foregoing objects, the inventors have devised a new I/O bus, generally operating under a SCSI-type protocol, said bus comprising a primary I/O bus, and a plurality of secondary I/O buses, pigtailed to said primary bus. The pigtailed I/O buses are longer than the 100 mm stubs which are sanctioned under a SCSI protocol.

The I/O bus is used in conjunction with an online repairable multiple drive library computer system comprising a plurality of storage drives. The drives are connected to the I/O bus via the plurality of secondary I/O buses which are pigtailed to the primary I/O bus. The primary I/O bus is connected to a library controller. The library controller communicates with a host system via the I/O bus. The controller communicates with the drives via an internal general purpose bus running between the controller and each of the storage drives.

The new I/O bus allows good drives in a multiple drive library computer system to remain online, and accessible to a host, during the repair of one or more failed drives.

Library down time is thereby significantly reduced, or in the case of a removable media type library, library down time is eliminated.

These and other important advantages and objectives of the present invention will be further explained in, or will become apparent from, the accompanying description, drawing and claims.

BRIEF DESCRIPTION OF THE DRAWINGS

An illustrative and presently preferred embodiment of the invention is illustrated in the drawing in which:

FIG. 10 is a table of the drive state definitions used in the method of online drive repair disclosed herein;

FIG. 11 gives the specifications of the SCSI "Write Buffer" command used by a host computer in accomplishing the method of online drive repair disclosed herein; and FIG. 12 gives the specifications of the SCSI "Read Buffer" command used by a host computer in accomplishing the method of online drive repair disclosed herein.

DESCRIPTION OF THE PREFERRED EMBODIMENT

Figure 1:
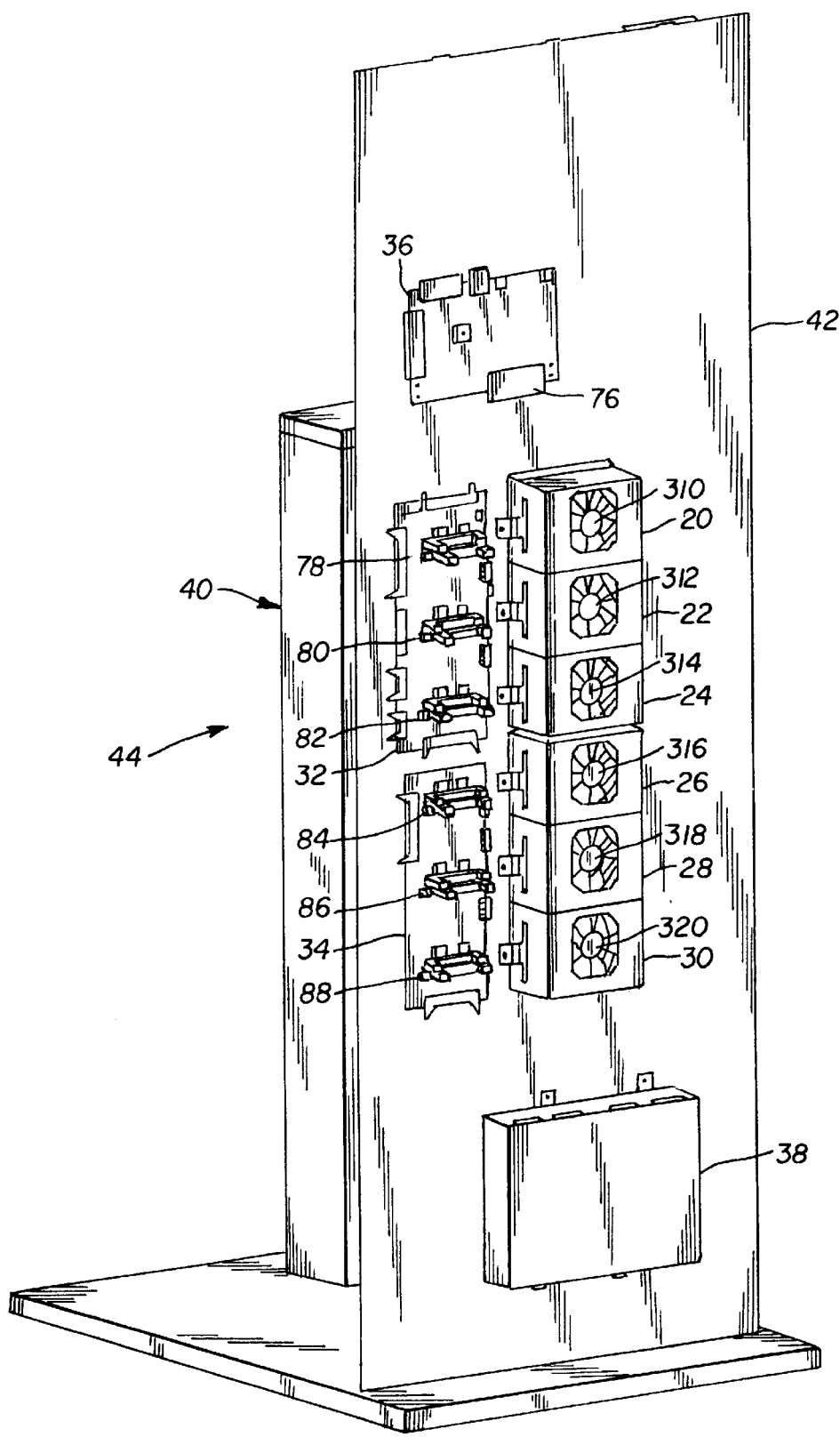
FIG. 1 is a perspective view showing a multiple drive library computer system.
Figure 2:
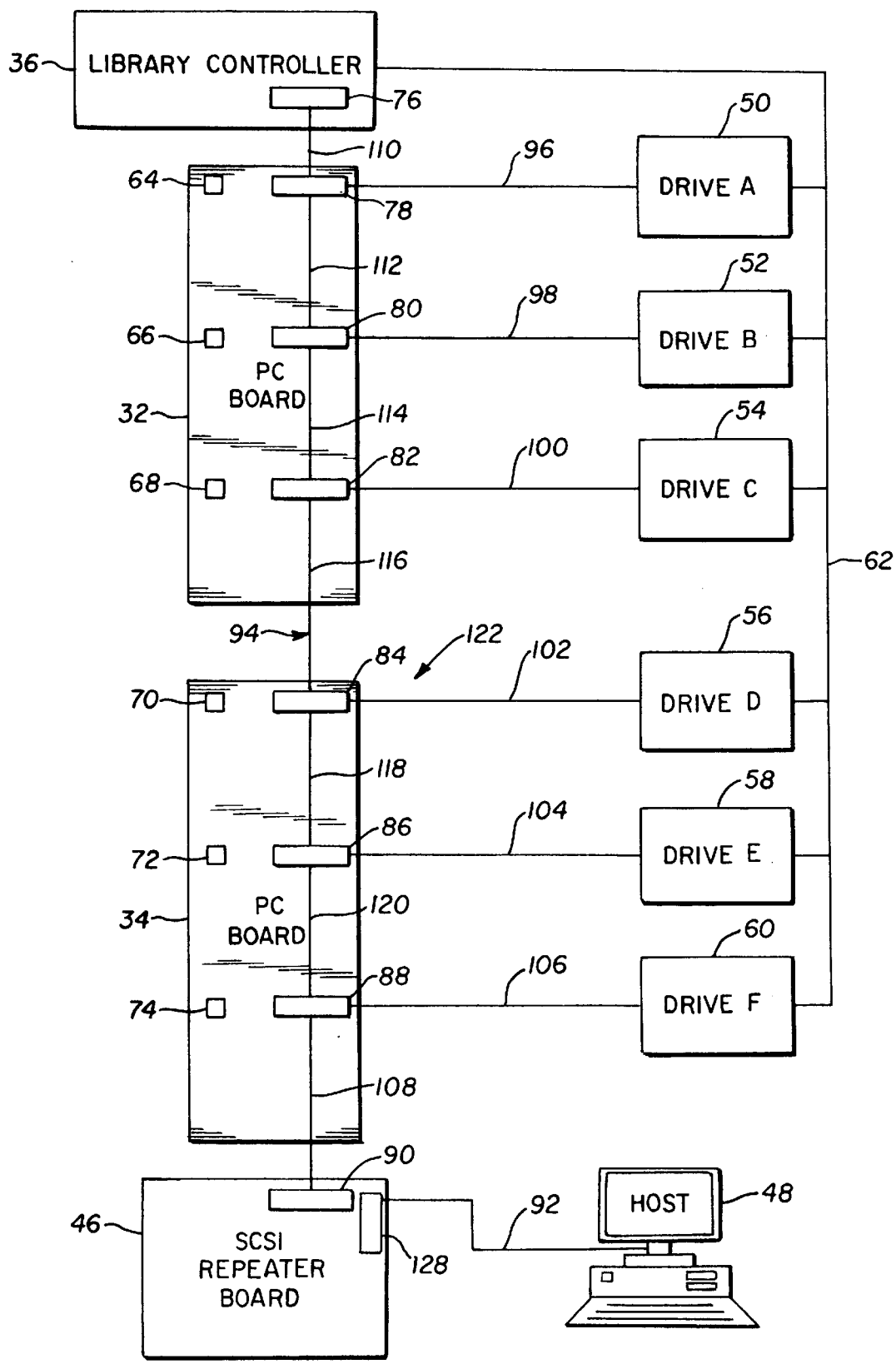
FIG. 2 is a diagrammatic view showing the six drives of FIG. 1 connected to other library system components via an I/O bus.
Figure 4:
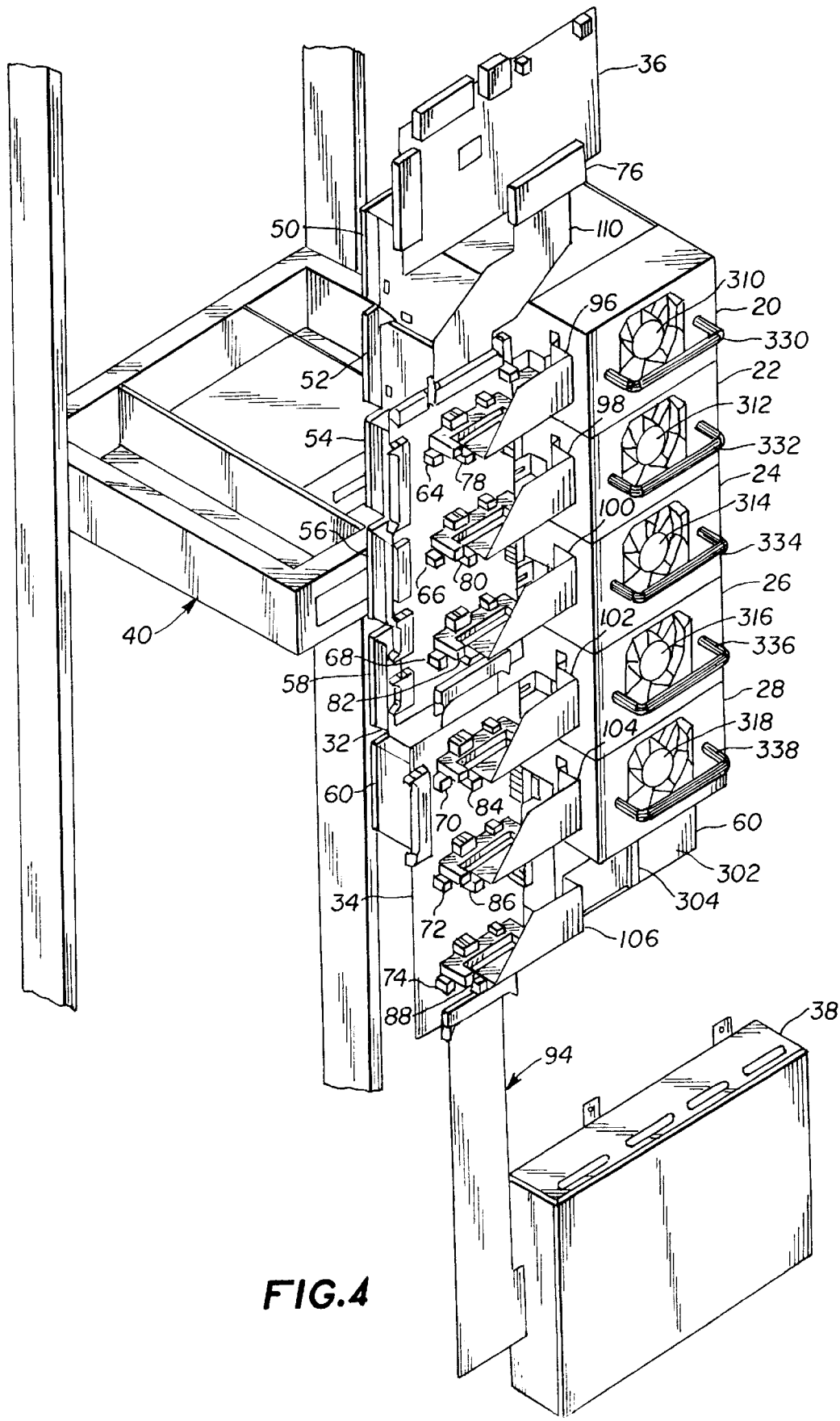
FIG. 4 is an enhanced version of FIG. 1, wherein the I/O bus of FIG. 2 has been added to the figure, one of the modular drive housings has been removed to show the details of the drive/bus connections, and the library's frame structure has been removed to reveal the system's robotic media inserter.

A multiple drive library computer system 44 is pictured in FIGS. 1, 2 & 4, which may generally comprise an I/O bus 122, generally operating under a SCSI protocol, said bus 122 comprising a primary I/O bus 94 and a plurality of secondary I/O buses 96, 98, 100, 102, 104, 106, pigtailed to said primary bus 94, a plurality of storage drives 50, 52, 54, 56, 58, 60 connected to said plurality of secondary I/O buses (96, 98 . . . ), and a library controller 36, connected to said primary I/O bus 94, said controller 36 comprising firmware to communicate with a host computer 48 via said I/O bus 122, and firmware to communicate with said storage drives (50, 52 . . . ) via a general purpose bus 62.

Having thus described the multiple drive library computer system in general, the system will now be described in further detail.

In a first preferred embodiment, the library system 44 comprises six computer storage drives (50, 52 . . . ). The storage drives are housed in six modular housings 20, 22, 24, 26, 28, 30, each of which can hold one full-height drive (50, 52 . . . ).

The drives (50, 52 . . . ) are connected to other library system components via an internal I/O bus 122. This bus 122 generally operates under a Small Computer Systems Interface protocol (SCSI protocol). See FIG. 2. The internal I/O bus 122 further comprises a primary I/O bus 94, and a plurality of secondary I/O buses (96, 98 . . . ), pigtailed to said primary I/O bus 94. All storage drives (50, 52 . . . ) are connected to the I/O bus 122 via the secondary (pigtailed) buses (96, 98 . . . ).

In FIG. 2, the primary I/O bus 94 is shown running between connectors 78, 80, 82, 84, 86, 88 on upper 32 and lower 34 interposer PC boards. Some sections of the primary I/O bus 94 may comprise traces 112, 114, 118, 120 etched into the interposer boards 32, 34. Other sections 108, 110, 116 of the primary I/O bus 94 may comprise standard SCSI cabling.

A general purpose bus 62 is connected between the storage drives (50, 52 . . . ) and the library controller 36. While the primary function of the SCSI protocol I/O bus 122 is data transfer, the primary function of the general purpose bus is communication between the storage drives (50, 52 . . . ) and the library controller 36.

Figure 5:
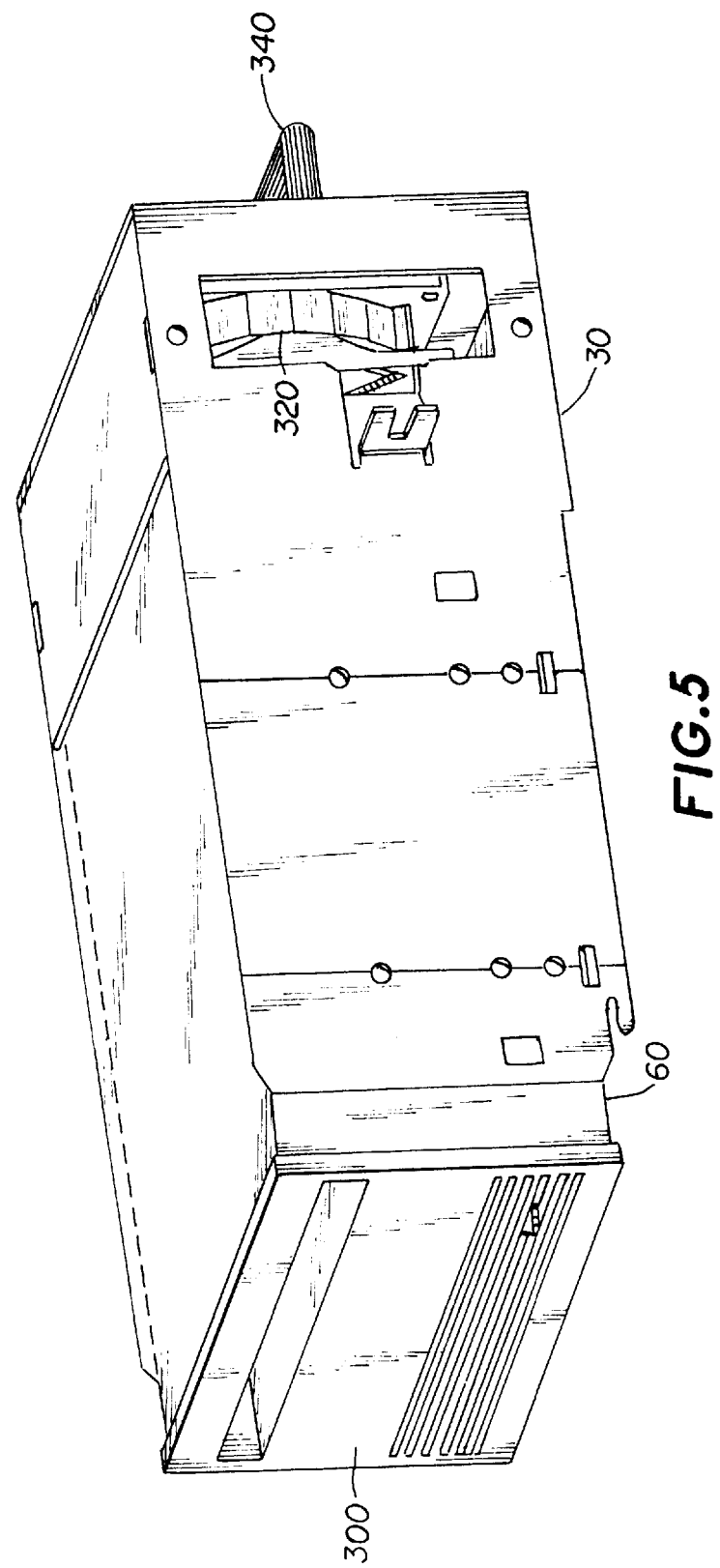
FIG. 5 is a rear perspective view of one of the modular drive housings shown in FIG. 1, wherein one full-height drive is mounted therein.

FIG. 4 shows the rear face of a storage drive 60. The storage drives (50, 52 . . . ) shown are optical, removable media type drives. See. FIG. 5. Each drive (50, 52 . . . ) has a media inserting face 300 abutting a robotic media inserter 40. The media inserting face 300 of a drive 60 is shown in FIG. 5. A typical placement of a robotic media inserter 40 is best seen in FIG. 4. Robotic media inserters for optical, removable media type drives are disclosed in U.S. Pat. No. 5,010,536 and U.S. Pat. No. 5,730,031, which are hereby specifically incorporated by reference. Opposite said media inserting faces 300, the drives (50, 52 . . . ) have electrical connection faces 302. Each electrical connection face 302 has a connector (e.g. connector 304 on drive 60 as shown in FIG. 4) for connecting a secondary I/O bus (96, 98 . . . ) and a connector to which a power cable may be attached (not shown).

The primary I/O bus 94 is attached to a library controller 36 (or autochanger controller) at connector 76. As earlier mentioned, a general purpose bus 62 is also attached to the controller. The controller 36 comprises firmware which allows it to communicate with the storage drives (50, 52 . . . ) via the general purpose bus 62. The controller 36 also comprises firmware which allows it to communicate with a host 48 (whether it be a UNIX® work station, PC network server or otherwise) via the SCSI protocol I/O bus 122.

The controller 36 is responsive to host commands and may perform such operations as keeping track of the location of removable media cartridges, moving removable media cartridges, and relaying its successes and/or failures to the host 48. The controller 36 may also process and carry out library commands. Although the controller 36 may also be responsible for changing drive states, in the preferred embodiment, this is left to the host 48. Although the controller 36 contains a microprocessor, the controller is a component which may only speak when spoken to—it cannot initiate action.

The controller 36 may also comprise firmware which allows it to enable or disable power to one or more storage drives (50, 52 . . . ). In so enabling or disabling power, a system for suppressing power transients is used. This power transient suppression system is similar to that disclosed in U.S. patent application Ser. No. 08/331,468 filed Oct. 31, 1994 now abandoned, which is hereby specifically incorporated by reference. Alternatively, switches (not shown) could be used to enable or disable power to the drives (50, 52 . . . ).

An LED 64, 66, 68, 70, 72, 74 is mounted next to each drive (50, 52 . . . ). The LEDs (64, 66 . . . ) are mounted on the interposer boards 32, 34. The LEDs (64, 66 . . . ) may be controlled by either the library system 44 or the host 48 to serve as a visual indication of the status of a drive (50, 52 . . . ) to a service technician. For example, a lighted LED (64, 66 . . . ) could signify "power on", an unlighted LED (64, 66 . . . ) could signify "power off", and a flashing LED (64, 66 . . . ) could signify a powered drive in an "Offline_ failed" state (this state will soon be described in more detail).

A SCSI repeater board 46 is also connected to the primary I/O bus 94 via connector 90. See FIG. 2. The repeater board 46 is contained within repeater board enclosure 38. The repeater board 46 is responsible for electrically isolating I/O bus 122 from the outside world. It protects the protocol used on bus 122 from being reconfigured by a component outside the library system 44, such as the host 48. The repeater board 46 provides an input 128 for an external SCSI bus 92 which connects the library system 44 to a host 48. The host 48 may be a UNIX® work station, PC network server, or other host device as previously mentioned.

The repeater board 46 is especially important in the library system 44 outlined above due to the configuration of the I/O bus 122. A typical SCSI system comprises several components which are daisy-chained together. Thus, removing one component from the system causes a break in the bus which can shut down communication with many components. Since a purpose of this invention was to achieve an online repairable system, it became necessary to construct a cable which allowed for removal of a single component without disabling the entire bus. To achieve the desired result, storage drives (50, 52 . . . ) are pigtailed to a primary I/O bus 94 via secondary I/O buses (96, 98 . . . ). Any secondary I/O bus (96, 98 . . . ) may be removed from the system without breaking the primary I/O bus 94 and interfering with communication between other system components via the primary I/O bus 94. However, SCSI protocol dictates that a bus 122 may comprise no more than six meters of cable, and a stub (such as pigtails 96, 98 . . . ) off of a primary bus 94 may be no longer than 100 mm. In the preferred embodiment described above, the primary bus 94 comprises approximately 62" of cable, and each pigtail (96, 98 . . . ) comprises approximately 12" of cable. The total cable length is 11'2". In order to successfully use a SCSI protocol (i.e., a single-ended SCSI cable configuration as defined by the ANSI X3. 131–1986 SCSI standard) on this newly invented bus cable, the I/O bus 122 must be isolated from the outside world, and cannot be subject to reconfiguration. The repeater board 46 serves this important function.

The storage drives (50, 52 . . . ) are mounted to the library system frame structure 42 via modular drive housings (20, 22 . . . ). In an alternative embodiment (not shown), the drives (50, 52 . . . ) could be individually mounted directly to the library system frame structure 42. However, this arrangement is not preferred due to the greater difficulty in accessing drives (50, 52 . . . ) while keeping the library system 44 online.

FIG. 5 shows a modular drive housing 30 removed from the library system 44. Each modular drive housing (20, 22 . . . ) comprises its own cooling fan 310, 312, 314, 316, 318 & 320, and a handle 330, 332, 334, 336, 338 & 340 for removing it from the library system 44. See also, FIG. 4.

Removal of a modular drive housing (20, 22 . . . ) is accomplished by first disconnecting any cabling extending from said modular housing (20, 22 . . . ) (such as I/O bus cables (96, 98 . . . ) and any power cables (not shown)). Since the electrical connection faces 302 of the drives (50, 52 . . . ) are not readily accessible while the drives (50, 52 . . . ) are mounted within a modular housing (20, 22 . . . ), cabling is disconnected at the interposer boards 32 & 34. As a consequence, secondary I/O buses (96, 98 . . . ) and portions of power cables will be removed with a modular housing (20, 22 . . . ). Once cabling is disconnected, a modular housing 30 may be removed from the library system 44. Cabling is not shown in FIG. 5 so as not to interfere with a view of cooling fan 320 and handle 340. A modular housing (20, 22 . . . ) is removed by pulling the modular housing (20, 22 . . . ) away from the robotic media inserter 40. Handles (330, 332 . . . ) on the modular housings (20, 22 . . . ) facilitate their removal. By way of example, a modular housing 30, and the drive 60 mounted therein, are removed from the library system 44 as a unit in FIG. 5.

In a second preferred embodiment, the library system 44 comprises twelve computer storage drives 150, 151, 152, 153, 154, 155, 156, 157, 158, 159, 160, 161. The twelve storage drives (150, 151 . . . ) are housed in the same six modular housings (20, 22 . . . ) identified above. Each modular housing (20, 22 . . . ) is designed so that it may, without any modification, hold either one full-height drive (50, 52 . . . ) or two half-height drives (150, 151 . . . ).

Figure 3:
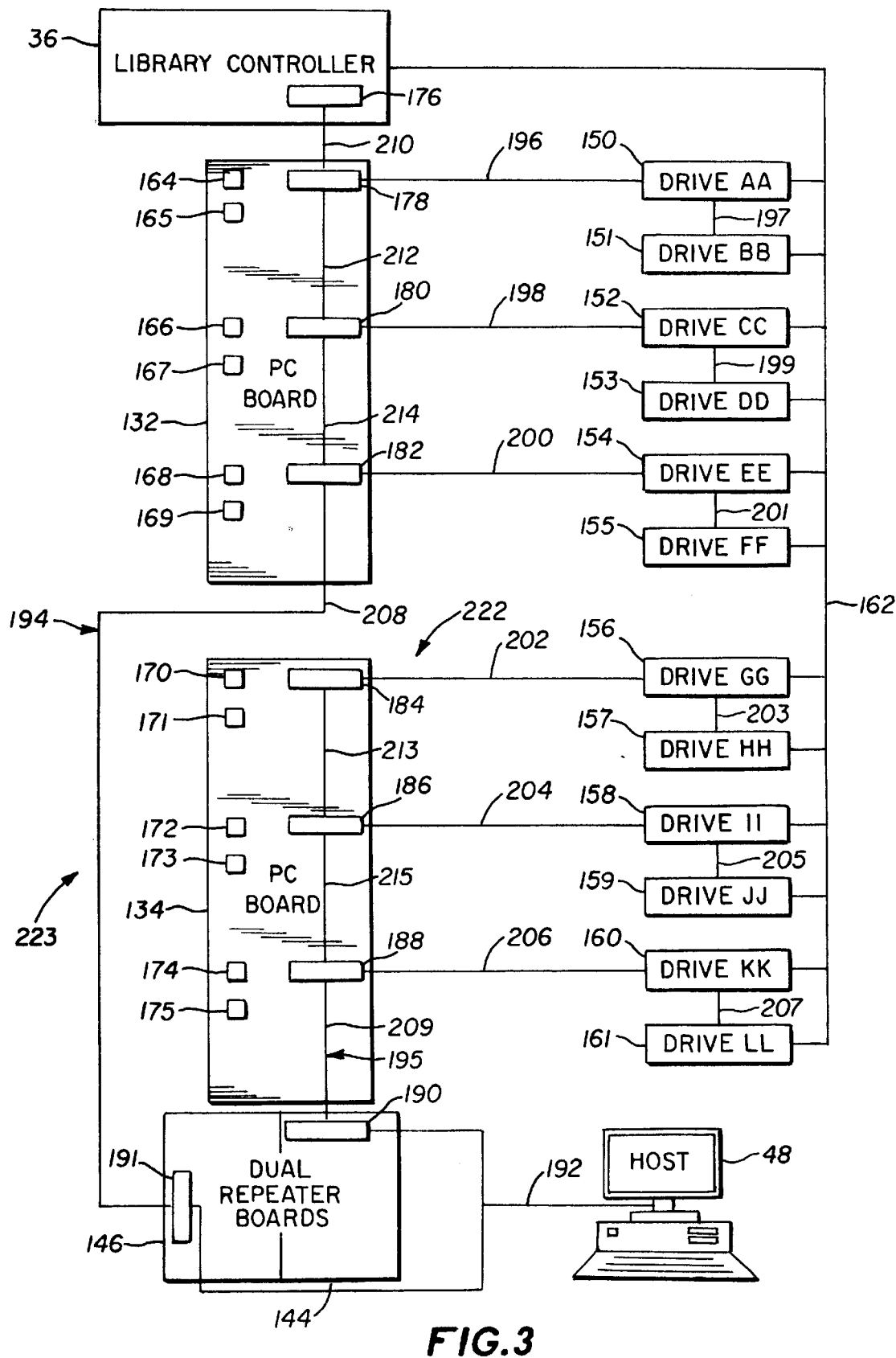
FIG. 3 is a diagrammatic view showing a variation on the system of FIG. 1 which includes twelve drives.

The drives (150, 151 . . . ) are connected to other system components via two internal I/O buses 222, 223. Each bus 222, 223 generally operates under a SCSI protocol. See FIG. 3. Two internal I/O buses 222, 223 are required in the twelve drive embodiment due to the SCSI limitation of eight component addresses on any particular bus. The first SCSI I/O bus 123 comprises a primary bus 194 which includes several cable sections 208, 210, 212, 214 running between numerous connectors 176, 178, 180, 182, 191, and secondary buses 196, 198, 200. The second SCSI I/O bus 122 comprises a primary bus 195 which again includes several cable sections 209, 213, 215 running between numerous connectors 184, 186, 188, 190, and secondary buses 202, 204, 206. Six of the twelve drives 150, 152, 154, 156, 158, 160 are connected directly to secondary buses 196, 198, 200, 202, 204, 206. The remaining six drives 151, 153, 155, 157, 159, 161 are connected to the SCSI I/O buses 222, 223 via the first six drives 150, 152, 154, 156, 158, 160 by way of several daisy-chained I/O buses 197, 199, 201, 203, 205, 207.

As in the first embodiment, a general purposes bus 162 runs between the storage drives (150, 151 . . . ) and the library controller 36. Upper 132 and lower 134 PC interposer boards again provide mounts for bus connectors 178, 180, 182, 184, 186, 188 and power status LEDs 164–175.

Due to the presence of two SCSI I/O buses 222, 223, two SCSI repeater boards are required 144, 146, one for each SCSI bus section. The host 48 is connected to each of the repeater boards 144, 146 via a SCSI compatible cable.

Figure 6:
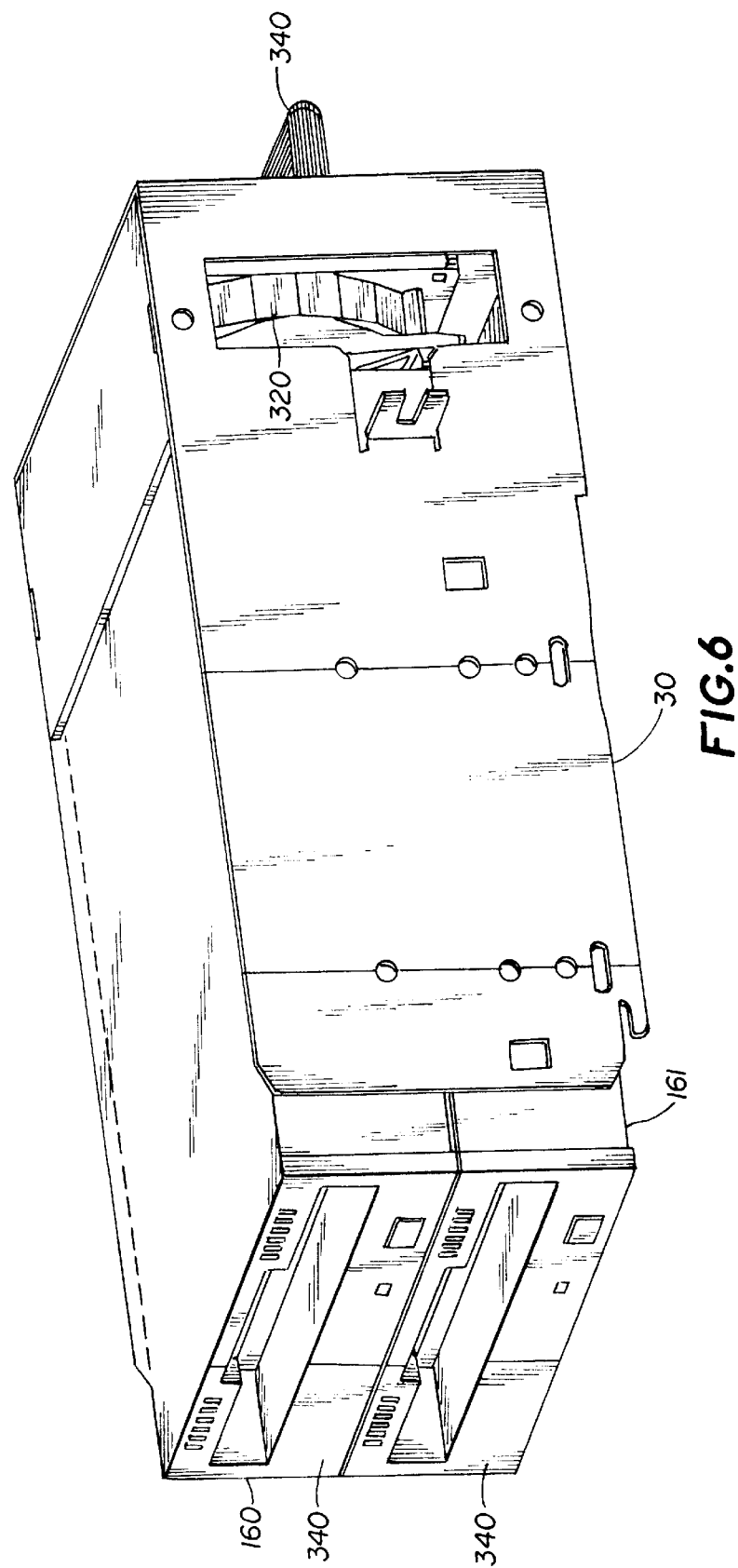
FIG. 6 is a rear perspective view of the modular drive housing of FIG. 5, wherein two half-height drives are now mounted therein.
Figure 7:
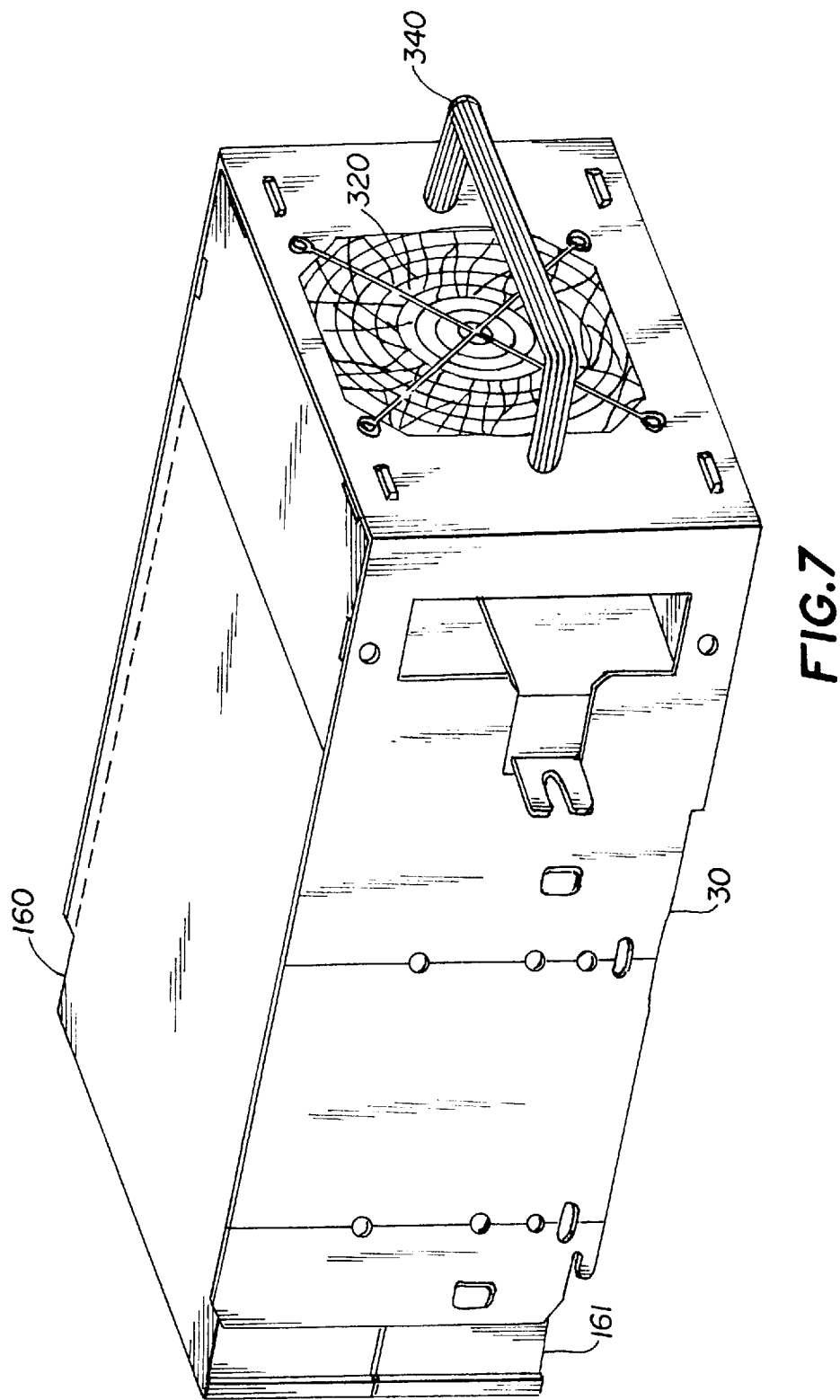
FIG. 7 is a front perspective view of the modular drive housing and drives of FIG. 6.
Figure 8:
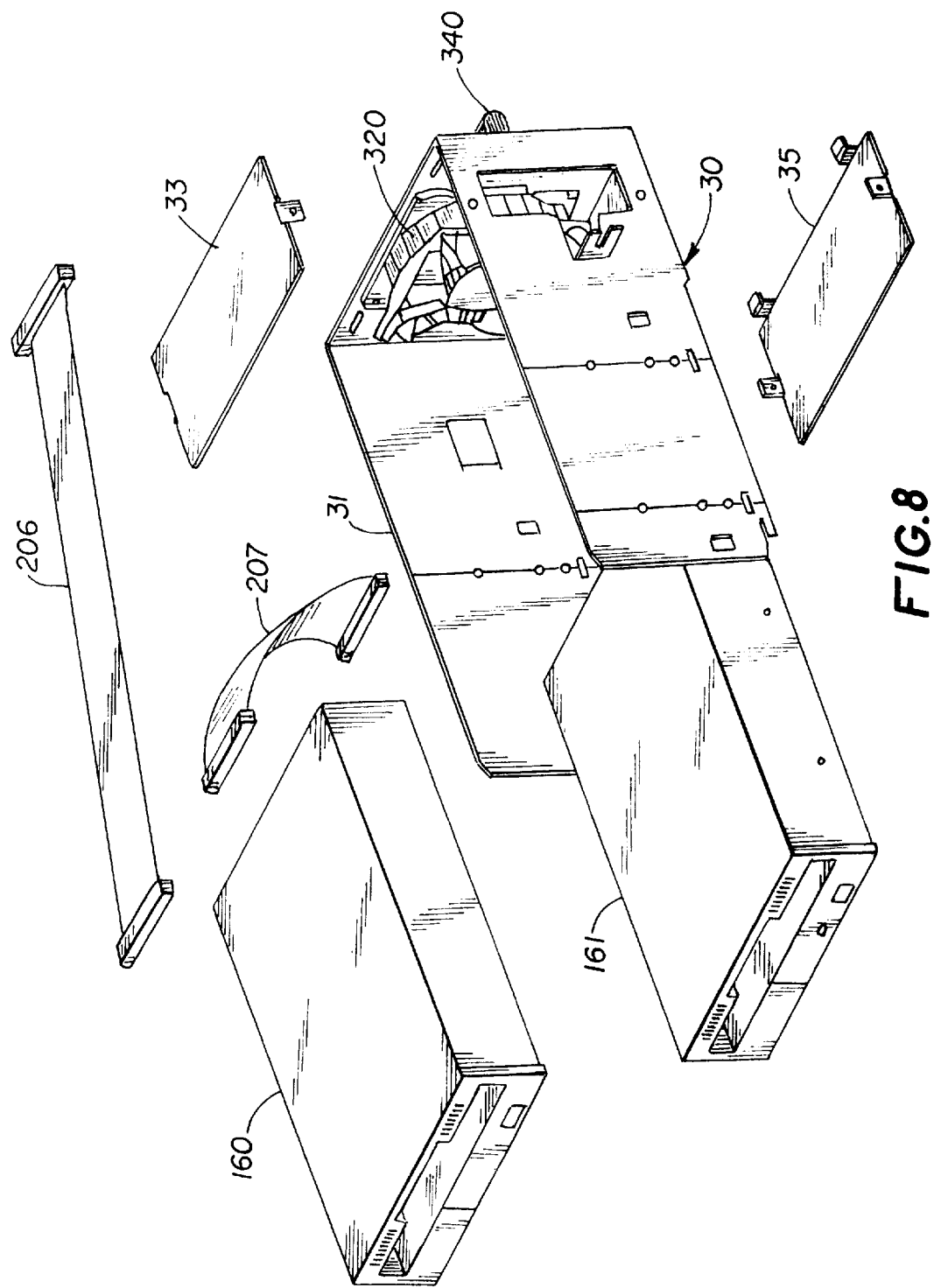
FIG. 8 is a rear perspective view of the disassembled parts of FIG. 6, wherein I/O buses have been added.

FIG. 6 shows a rear view of the modular housing 30 of FIG. 5, wherein two half-height drives 160, 161 have been substituted for the one full-height drive 60. The media inserting faces 340 of the two half-height drives 160, 161 are seen extending from the rear of the housing 30. FIG. 7 shows a front perspective view of the components of FIG. 6. FIG. 8 shows the two half-height drives 160, 161 and modular housing 30 of FIG. 6 in a disassembled fashion. The secondary I/O bus 206 and daisy-chained I/O bus 207 which connect the storage drives shown 160, 161 to the primary I/O bus 195 are also shown in FIG. 8. As previously stated, these I/O buses 206, 207 are removed with their storage drives 160, 161 and modular housing 30 as a unit. In this embodiment, the secondary I/O buses (196, 198 . . . ) are approximately fourteen inches in length. Finally, FIG. 8 reveals the three subsections 31, 33 & 35 which make up a modular housing 30.

Our method of repairing one or more drives in the multiple drive library computer systems described above is as follows. For purposes of this description, it will be assumed that the failed drive is a half-height drive 160 housed as a pair with another half-height drive 161 in a singular modular housing 30 contained within a system similar to that described in the second preferred embodiment described above. However, it is important to keep in mind that this method is also applicable to the repair of a full-height drive, or a drive in a library system wherein more than two drives are mounted within a singular modular housing 30. The method is also applicable to the repair of two or more drives at the same time.

Figure 9:
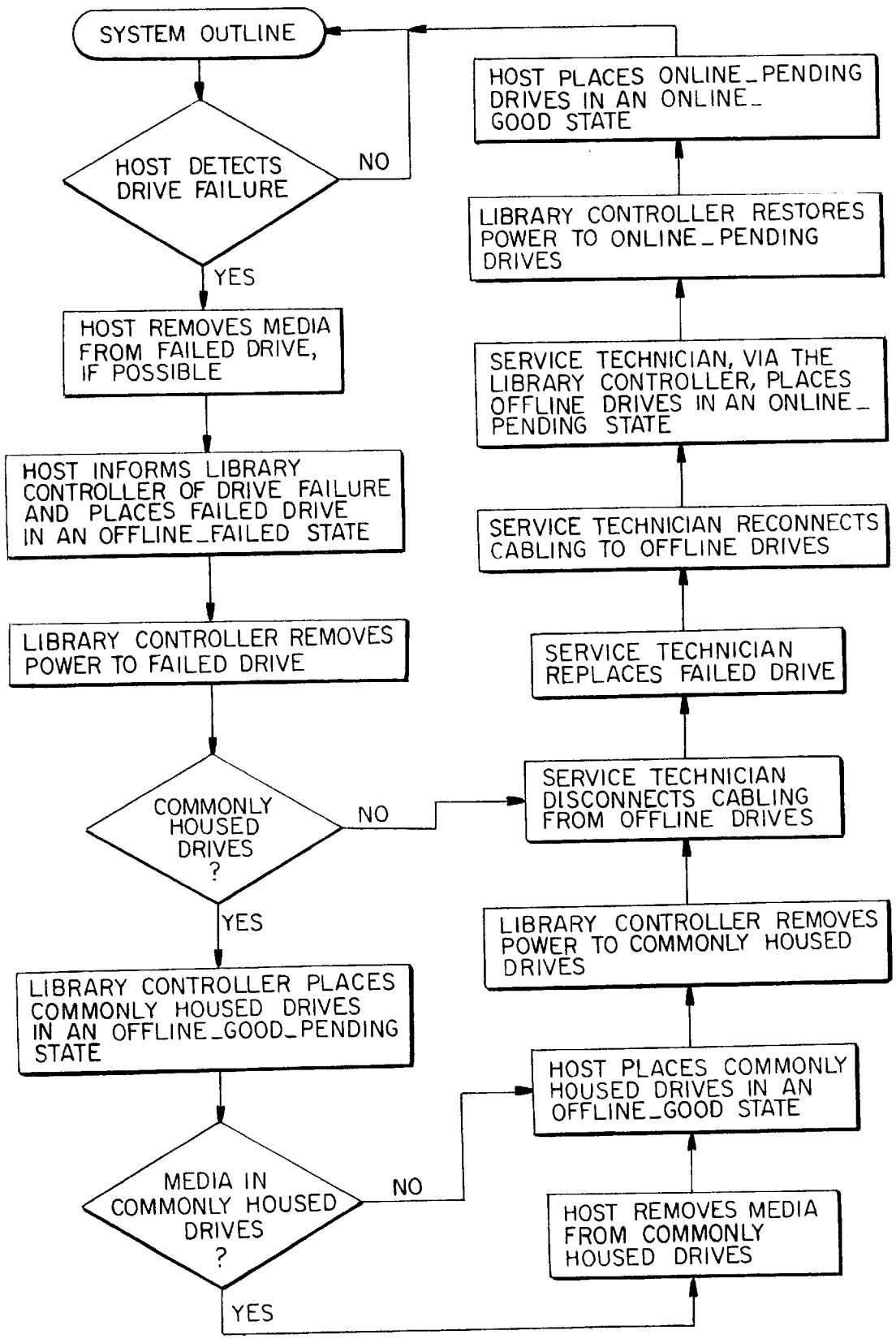
FIG. 9 is a flow chart of the steps involved in the method of online drive repair disclosed herein.

First, the failure of a drive must be detected or instructed. Refer to the flow chart in FIG. 9. This may be done by either the library controller 36 and/or the host 48. In the preferred method, the host's software provides the means for detecting when a drive 160 has failed. The host 48 may detect that a drive 160 has failed by several avenues. If the host 48 issues a command to the library to eject or load media to a drive 160 and receives a status code back from the library controller 36 indicating that the move operation was unsuccessful, the host 48 may assume that the drive 160 was at fault and is in need or repair. The host 48 may also detect drive failure from a system level error indicating that the drive 160 is not functioning correctly.

Once a drive's failure is detected, the host 48 attempts to remove media from the failed drive, if any is present. After removing media, the host 48 informs the library controller 36 of the drive failure, and places the drive 160 in an "Offline_failed" state. (Note: a description of all of the various drive states is found in FIG. 10) The library controller 36 will store the drive state information, and will not allow further access to the failed drive 160 until its state is changed to "Online_good". Drive states remain through power cycling.

The failed drive 160 may be serviced while the library system 44 remains online. It is therefore possible for the host 48 to continue accessing one or more good drives 150, 151, 152, 153, 154, 155, 156, 157, 158, 159 in an "Online_good" state, and retrieve information from media inserted into those drives, while the failed drive 160 is being repaired.

While the library system 44 remains operational, a qualified service person accesses the internal workings of the library (shown in FIG. 1). The service person will know which drive is in an "Offline_failed" state by a flashing LED 174 near the drive 160. If, as assumed, a failed drive is mounted in a modular housing 30 containing two half-height drives 160, 161, both drives 160, 161 will need to be taken offline. However, only the failed drive 160 will actually be replaced.

In the preferred embodiment, the host 48 will place the good drive 161 which is commonly housed with the failed drive 160 in an "Offline_good_pending" state. The host 48 can then remove media from the commonly housed good drive 161 before placing it in an "Offline_good" state.

With both drives 160, 161 in a drive pair offline, the library controller 36 will remove power to the drive pair. LEDs 174, 175 for the drive pair 160, 161 will indicate that power to the drives 160, 161 has been removed. At this point, the secondary I/O bus cable 206 may be safely disconnected from the primary I/O bus 195. Power cables to the drives (not shown) may also be disconnected at the PC interposer board 134 corresponding to the drives 160, 161 to be removed. In this manner, no interruption to the rest of the system 44 or the host 48 will occur.

The modular housing 30 containing the failed drive 160 may now be removed. The modular housing 30 is removed by pulling it away from the robotic media inserter 40. By removing the drives 160, 161 in this unconventional manner, the robotic media inserter 40 is not interrupted as it continues to feed media to the library's good drives 150, 152, 153, 154, 155, 156, 157, 158, 159.

After the failed drive 160 is replaced, the removed modular housing 30 is again mounted in its place, and cabling is reconnected to the removed drives 160, 161, the service technician sets the drive pair status to "Online_pending" via a switch (not shown) on the corresponding PC interposer board 134 which alerts the library controller 36. The library controller 36 will then apply power to the drive pair 160, 161, and will also inform the host 48 of the drive state changes. The host 48 then changes the states of the "Online_pending" drives to "Online_good". All of the library's drives (150, 151 . . . ) are now accessible to the host 48.

The host 48 may only access a drive (150, 151 . . . ) when it is in an "Online_good" or "Offline_good_pending" state. At all other times, the library controller 36 will deny access to a drive (150, 151 . . . ).

The host 48 changes drive states for the drives (150, 151 . . . ) via a SCSI "Write Buffer" command. Whenever the host 48 wants to change the state of a drive, it will simply issue the appropriate "Write Buffer" command. See FIG. 11 for specifications of the SCSI "Write Buffer" command.

The library controller 36 communicates to the host 48 via the SCSI "Unit Attention" condition. Whenever the library controller 36 wants to inform the host 48 of a change in the state(s) of the drive(s), it issues a "Unit Attention" condition on the next SCSI command sent by the host 48. Upon receiving the "Unit Attention" condition, the host 48 will send a SCSI "Read Buffer" command to determine the state change(s) of the drive(s). See FIG. 12 for specifications of the SCSI "Read Buffer" command. Specifications for the "Unit Attention" condition are as follows:

"Request Sense" data for the SCSI "Unit Attention" Condition

| Sense Key | = 6 | (Unit Attention) |
| --- | --- | --- |
| ASC | = 0x2A | (Parameters Changed) |
| ASCQ | = 0x80 | (Vendor Unique for HP Libraries) |

The library controller 36 will respond with a "Unit Attention" condition to any command from the host 48 (except Inquiry) when there is a pending state change for one or more of the library's storage drives (150, 151 . . . ). The host 48 must then send a "Read Buffer" command to determine the state change. The "Unit Attention" condition will only be reported once per state change. The host 48 may poll the library controller 36 with the "Read Buffer" command, if desired.

The library controller 36 will respond with an "Illegal Request" condition to any Move or Exchange command from the host 48 that involves a drive that is not in an "Online_good" or "Offline_good_pending" state. The specifications for the SCSI "Illegal Request" Condition are given below:

"Request Sense" data for the SCSI "Illegal Request" condition:

| Sense Key | = 5 | (Illegal Request) |
| --- | --- | --- |
| ASC | = 0x22 | (Illegal Function) |
| ASCQ | = 0x80 | (Vendor Unique for HP Libraries) |

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An I/O bus, said bus comprising:
 a) a primary I/O bus; and
 b) a plurality of detachable secondary I/O buses pigtailed to said primary I/O bus;
 wherein each of said plurality of detachable secondary I/O buses has a length in excess of 200 mm, and the I/O bus as a whole, but for its length, is configured as a single-ended SCSI cable.

2. An I/O bus as in claim 1, wherein said plurality of detachable secondary I/O buses are each approximately twelve inches in length.

3. An I/O bus as in claim 1, wherein said plurality of detachable secondary I/O buses are each approximately fourteen inches in length.

4. An I/O bus as in claim 1, wherein said I/O bus has a total cable length of approximately eleven feet, two inches.

5. An I/O bus as in claim 2, wherein said I/O bus has a total cable length of approximately eleven feet, two inches.

6. An I/O bus as in claim 1, wherein said primary I/O bus further comprises first and second ends, and said I/O bus further comprises a SCSI repeater board connected to one of said ends of said primary I/O bus.

7. An I/O bus, said bus comprising:
  a) first and second primary I/O buses;
  b) a first set of detachable secondary I/O buses, pigtailed to said first primary I/O bus;
  c) a second set of detachable secondary I/O buses, pigtailed to said second primary I/O bus; and
  d) means for interfacing between said first and second primary I/O buses;

wherein each of said detachable secondary I/O buses has a length in excess of 200 mm, and the I/O bus as a whole, but for its length, is configured as a single-ended SCSI cable.

8. An I/O bus as in claim 7, wherein each of said detachable secondary I/O buses is approximately fourteen inches in length.

9. An I/O bus as in claim 7, wherein each of said first and second primary I/O buses comprises first and second ends, and said I/O bus further comprises:
  a) a first SCSI repeater board connected to one of said ends of said first primary I/O bus; and
  b) a second SCSI repeater board connected to one of said ends of said second primary I/O bus.

* * * * *